UNITED STATES PATENT OFFICE.

GUSTUS H. HAVENS, OF LANSING, MICHIGAN.

WATERPROOFING COMPOSITION.

1,418,374. Specification of Letters Patent. Patented June 6, 1922.

No Drawing. Application filed October 30, 1920. Serial No. 420,736.

*To all whom it may concern:*

Be it known that I, GUSTUS H. HAVENS, a citizen of the United States, residing at Lansing, in the county of Ingham and State of Michigan, have invented a new and useful Improvement in Waterproofing Composition, of which the following is a specification.

My invention relates to waterproofing composition and more especially to composition intended to be either mixed with the materials used in making hydraulic cement walls or blocks or to be painted upon cement surfaces for the purpose of filling the pores and making them water and moisture proof. Its purposes are to make a composition that shall be more easily applied, spread more readily, and be more efficient in its operation than those commonly used.

I am aware that for waterproofing purposes it is customary to mix with hydraulic cement or a mixture of hydraulic cement and lime, various mineral composition such as copper or iron sulphates, alum, and also organic acids, such as tartaric, citric, and the like, but I have found that by the addition of a small quantity of an organic mucilage, preferably the mucilage from slippery elm bark, or the bark itself, very finely powdered, the composition is rendered much more efficient in operation and also is easier in application. The proportions of the various articles and of the mucilage or mucilaginous substance will vary considerably depending upon whether the composition is to be mixed with the cement itself in forming the blocks or walls or to be applied on the surface and if the latter, they will vary considerably according to the character and condition of the surface to which they are to be applied. All this is entirely familiar to those acquainted with the art of waterproofing cement. I also find that where the surface is very dry and porous, the mucilage is better than the finely powdered bark.

While, as stated above, I prefer powdered slippery elm or the mucilage therefrom for the mucilaginous substance, any other substance yielding a mucilage in solution may be employed without departing from my invention.

In preparing my waterproofing composition for ordinary purposes, I mix together about one and one fourth ounces of alum, one and one fourth ounces of very finely powdered slippery elm bark and one and one half ounces of copper sulphate. To prepare the mixture for use I put the above in about two gallons of water. To this I add about five pounds of hydrated lime and then thicken to the desired consistency to the purpose for which I desire to employ it, with hydraulic cement. As I stated above, the exact proportions are not in any way material to my invention. The quantity of any one of them may be, and should be, varied considerably according to the purpose for which the waterproofing is to be employed. Tartaric acid may be used instead of the copper sulphate, using about three fourths of an ounce, in places where the copper sulphate would be objectionable because of its color.

I claim as my invention and desire to secure by Letters Patent:

1. A waterproofing composition containing hydraulic cement, hydrated lime and an organic mucilaginous substance.
2. A waterproofing composition containing hydraulic cement, hydrated lime and a mucilage formed from slippery elm bark.
3. A waterproofing composition containing hydraulic cement, and finely powdered slippery elm bark.
4. A waterproofing composition containing hydraulic cement, hydrated lime and finely powdered slippery elm bark.
5. A waterproofing composition containing hydraulic cement, hydrated lime, alum and finely powdered slippery elm bark.
6. A waterproofing composition containing hydraulic cement, hydrated lime, alum, copper sulphate and finely powdered slippery elm bark.

GUSTUS H. HAVENS.

Witnesses:
JOHN MCCLELLAN,
CARL H. MCLEAN.